(12) United States Patent
Shinoda

(10) Patent No.: US 9,127,740 B2
(45) Date of Patent: Sep. 8, 2015

(54) ANTI-VIBRATION CLAMP

(71) Applicant: NEWFREY LLC, Newark, DE (US)

(72) Inventor: Yoshinori Shinoda, Toyohashi (JP)

(73) Assignee: NEWFREY LLC, Newark, DE (US)

( * ) Notice: Subject to any disclaimer, the term of this patent is extended or adjusted under 35 U.S.C. 154(b) by 0 days.

(21) Appl. No.: 14/015,165

(22) Filed: Aug. 30, 2013

(65) Prior Publication Data

US 2014/0070070 A1 Mar. 13, 2014

(30) Foreign Application Priority Data

Aug. 31, 2012 (JP) .................................. 2012-191129

(51) Int. Cl.
*F16L 3/08* (2006.01)
*F16F 7/12* (2006.01)
*F16L 3/02* (2006.01)
*F16L 3/13* (2006.01)
*F16L 3/237* (2006.01)
*F16L 55/035* (2006.01)

(52) U.S. Cl.
CPC ... *F16F 7/12* (2013.01); *F16L 3/02* (2013.01); *F16L 3/13* (2013.01); *F16L 3/237* (2013.01); *F16L 55/035* (2013.01); *F16F 2226/04* (2013.01); *Y10T 29/4987* (2015.01)

(58) Field of Classification Search
CPC .......... F16F 7/12; F16F 2226/04; F16L 3/02; F16L 3/13; F16L 3/237; F16L 55/035; Y10T 29/4987
USPC .......................................... 248/68.1, 74.2, 49
See application file for complete search history.

(56) References Cited

U.S. PATENT DOCUMENTS

| 7,328,873 | B2 | 2/2008 | Suzuki et al. | |
| 2008/0197241 | A1* | 8/2008 | Bauer | 248/68.1 |
| 2012/0153095 | A1* | 6/2012 | Child et al. | 248/68.1 |
| 2013/0146720 | A1* | 6/2013 | Meyers et al. | 248/68.1 |

FOREIGN PATENT DOCUMENTS

| JP | 2001241569 A | 9/2001 |
| JP | 2006226394 A | 8/2006 |
| JP | 2008190682 A | 8/2008 |

* cited by examiner

*Primary Examiner* — Amy Sterling
(74) *Attorney, Agent, or Firm* — Michael P. Leary

(57) ABSTRACT

An anti-vibration clamp for holding pipes includes a pipe holding component which further includes pipe holders for locking the pipes; a clamp body including a stud locking portion for locking to a stud, and a floating attachment portion for holding the pipe holding component; and an elastic connecting component made of soft resin placed between the pipe holding component and the clamp body so that the pipe holding component and the clamp body do not contact one another directly. The pipe holding component, the elastic connecting component and the clamp body are held so that it is difficult for them to each slip mutually.

6 Claims, 15 Drawing Sheets

ANTI-VIBRATION CLAMP

CROSS-REFERENCE TO RELATED APPLICATIONS

This application claims priority from Japanese Patent Application No. 2012-191,129, filed on Aug. 31, 2012, the disclosure of which is incorporated herein by reference.

BACKGROUND OF THE INVENTION

The present invention pertains to a pipe clamp for holding an item having a long and narrow shape such as a pipe or wire harness on an attached component of a car body; and in particular to an anti-vibration clamp which is made so that it does not transmit the vibration from an item such as a pipe or tube or the like to an attached component on a car body or the like, or transmit the vibration from an attached component such as a body panel or the like to an item such as a pipe or the like.

Pipe clamps are known which are provided with a clamp portion which holds a long component such as a pipe or the like, and a main body portion which is securely attached to an attached component such as the body panel of an automobile or the like, and in which the pipe is attached to an attached component by means of securely fixing the main body portion to the attached component, the pipe being held in the clamp portion. The clamp portion has an open portion on top so as to receive the pipe, and is constructed so as to contain the pipe in a U-shaped space formed from a pair of side wall portions and a bottom portions; and the contained pipe is held so as to not slip out of the clamp portion. The main body portion has a secure attaching means for attaching to an attached component such as a body panel or the like, and is securely fixed to an attached component such as a body panel of a card body, or the like.

There may be instances in which vibration is produced in the pipe, caused by the pulsation of fluids passing through the pipe, or the like. It is necessary to prevent transmitting this sort of vibration through the pipe clamp to the car body side. Also, it is necessary to make it so that the vibration of the car body side is not transmitted to the pipe through the pipe clamp.

For this reason, there are pipe clamps that hold the pipe with a soft plastic material or the like. In this pipe clamp, the pipe does not directly come in contact with a pipe holding component made of hard plastic, and it becomes difficult for the vibration of the pipe to be propagated to the car body side. However, there is no avoiding a lowering of the holding power for the pipe.

Furthermore, there are pipe clamps which make transmitting vibration from the clamp portion to the main body portion difficult by forming the clamp portion which holds the pipe and the main body portion which is securely fixed to the attached component from hard plastic, and placing an elastic component made from rubber or soft plastic between the clamp portion and the main body portion. This sort of floating-type clamp is effective for absorbing vibration. However, the problem exists that it is difficult to join a soft elastic component to a hard clamp portion and main body portion.

Japanese unexamined patent publication JP2008-190682 discloses an anti-vibration clamp device which is comprised of a tube holding component which has a holding portion holding each of multiple tubes or the like individually, each holding portion being connected integrally at the base by a hard synthetic resin; a body mounting component formed from a hard synthetic resin for securely fixing the tube holding component to the body and the like; and an elastic connecting component placed between the tube holding component and the body mounting component which has a vibration absorbing function and elastically connects the tube holding component and the body mounting component. The elastic connecting component remains between the tube holding component and the body mounting component and has a function which prevents the transmission of vibration between both.

In the anti-vibration clamp device of JP2008-190682, because an elastic connecting component with a complex shape exists in the space between the tube-holding component and the body mounting component, it is difficult for each component to slip. However, when the tube holding component and the body mounting component have been set in a mold, a rubber-like compound or a soft synthetic resin is poured in and hardened, forming the elastic connecting component; that is, because insert molding is done, equipment for insert molding and metallic molds are needed.

Japanese unexamined patent publication JP2005-155749 discloses a pipe clamp provided with a car body joining component made of a hard material for attaching to a car body; a pipe holder made of a hard material for holding a pipe; and an anti-vibration component made from a soft material which is interposed between them. The anti-vibration component is provided with an engaging portion for the car body joining component and an engaging portion for the pipe holding component. When the three parts are assembled together, it is attached so that the anti-vibration component is laid down on the outer side of the pipe holding component, and the assembled unit of the pipe holding component and the anti-vibration component is inserted into the car body joining component. The space between the pipe holding component and the anti-vibration component and the space between the anti-vibration component and the car body joining component are mutually engaged by means of an engaging portion.

In the pipe clamp of JP2005-155749, the three parts can be assembled by a manual operation. The space between the pipe holding component and the anti-vibration component and the space between the anti-vibration component and the car body joining component are prevented from slipping out by means of ribs, protuberances, or the like. In regard to the engaging portion of the anti-vibration component made from soft material, there is the fear that each part may slip when a strong force is applied in the axial direction of the pipe.

Japanese unexamined patent publication JP2006-226394 discloses a clamp comprised of a clamp body which is capable of holding a pipe; an anti-vibration component made of rubber which is mounted on the main body; and a clip which engaging with the main body of the clamp, locks at the body panel. The clamp body, anti-vibration component, and clip are assembled by mounting the anti-vibration component on a mounting portion of the clamp body, and a long plate at the top of the clip passes through a long aperture portion of the anti-vibration component, and being rotated, the long plate is placed between protuberances on the upper surface of the anti-vibration component. In the clamp of JP2006-226394, by rotating it as far as the attachment position, the sliding resistance becomes small, and it becomes possible to objectively determine that it has been attached in a specific position.

However, in the clamp of JP2006-226394, the rotation of the clamp body and the clip is stopped by means of protuberances on the upper surface of the anti-vibration component, and when a strong force is applied in the direction of rotation, the concern exists that the clip may rotate. Also, because the clamp body and the clip contact in a narrow surface area, there is a concern that the clamp body, the clip, and the anti-vibration component may slip relative to one another when a strong force is applied from the outside.

Japanese unexamined patent publication JP2001-241569 discloses a pipe support component which is provided with a pipe holding component, a pair of tubular rubber components (elastic components) which are mounted in an insertion aperture of a pipe holding component and a locking component which is mounted in the inner aperture of a tube of a rubber component. A pair of rubber components is inserted from both sides of the insertion aperture of a pipe holding component, and if the locking component is inserted in the inner aperture of the tube of the rubber component, a hook of the locking component engages with a groove of the rubber component to prevent slipping.

However, in the pipe holding component of JP2001-241569, because the locking component and the rubber component engage by a hook being inserted in a groove, the joining strength is weak. Furthermore, the pair of rubber components which are inserted from both sides of the insertion aperture do not mutually join. For this reason, the joining strength between the mutual parts is inadequate.

For this reason, an anti-vibration clamp is sought which has high joining strength between the structural parts, in which it is difficult for the pipe holding component which holds the pipe, the clamp body which attaches to the body panel or the like, and the elastic component between these to slip.

In addition, an anti-vibration clamp is sought which can be simply molded without using equipment for insert molding or a metallic mold.

In addition, an anti-vibration clamp is sought in which the structural parts can be simply assembled without the use of assembly tools.

SUMMARY OF THE INVENTION

The object of the present invention is to offer an anti-vibration clamp with high joining strength between the structural parts, in which the pipe holding component which holds the pipe, the clamp body which attaches to a body panel or the like, and the elastic component between these slip with difficulty.

Another object of the present invention is to offer an anti-vibration clamp which can be simply molded without using equipment for insert molding or a metallic mold.

Another object of the present invention is to offer an anti-vibration clamp in which the structural parts can be simply assembled without the use of assembly tools.

In the present invention, the pipe holding component for holding a pipe or the like, and the clamp body which attaches to a body panel, are molded from a separate, individual hard resin, and an elastic connecting component made from a soft resin is placed between them so that the pipe holding component and the clamp body are not in direct contact. If the elastic connecting component is drawn out by hand and laid down on the pipe holding component, the locking means of the pipe holding component and the locking means of the elastic connecting component are locked, and the pipe holding component and the elastic connecting component do not slip.

In addition, the assembled unit of the pipe holding component and the elastic connecting component locks with the locking means of the clamp body so that the pipe holding component, elastic connecting means and clamp body do not mutually slip.

One embodiment of the present invention is an anti-vibration clamp for holding a pipe and is provided with a pipe holding component made of hard resin, which has a pipe holder for holding a pipe; a clamp body made of hard resin which has a stud locking portion for locking to a stud, and a floating attachment portion for holding the pipe holding component; and an elastic connecting component made of soft resin placed between the pipe holding component and the clamp body so that the pipe holding component and the clamp body are not in direct contact, and so that the pipe holding component, the elastic connecting component, and the clamp body are held so that they do not each slip mutually, that is relative to each other.

Because the pipe holding component and the clamp body are not in direct contact, it is possible to obtain an anti-vibration component with a high anti-vibration function.

Also, it is possible to securely hold the pipe because the pipe holding component, the elastic connecting component, and the clamp body do not slip mutually, by means of a locking means.

The pipe holding component has a holding rib which projects at one end portion and the elastic connecting component has a holding rib containing portion at one end which contains the holding rib, and the clamp body, at one end of the floating attachment portion has a holding rib insertion aperture into which the holding rib containing portion enters; and the holding rib is contained in the holding rib insertion aperture through the holding rib containing portion, and it is desirable for the holding rib of the pipe holding component to be held without contacting the clamp body.

In this way, it is possible to obtain a high anti-vibration function, while preventing the pipe holding component from slipping in the upward or sideways direction of the clamp body.

The pipe holding component has a ridge portion on the bottom of the end opposite the end already mentioned, and the elastic connecting component has a curved portion, which is curved, for containing the ridge portion, at the end opposite the end already mentioned, and the clamp body has a lock bar which projects in a diagonally downward direction, at the end opposite the end already mentioned of the floating attachment portion; and the ridge portion of the pipe holding component is contained in the curved portion of the elastic connecting component, and the curved portion of the elastic connecting component is pressed by the lock bar of the clamp body; and it is desirable that the ridge portion of the pipe holding component is held so that it does not contact the clamp body.

In this way, it is possible to achieve a high anti-vibration function, and it is possible to prevent the pipe holding component from slipping in the upward or sideways direction of the clamp body.

The pipe holder of the pipe holding component has a pair of side surfaces, and the elastic connecting component has a pair of side walls for both sides of the pair of side surfaces; the floating attachment portion of the clamp body has a pair of side walls for both sides of the pair of side walls of the elastic connecting component, and the side surfaces of the pipe holding component is placed between the pair of side walls of the floating attachment portion through the pair of side walls of the elastic connecting component; and it is desirable that the pair of surface portions of the pipe holding component do not contact the side walls of the clamp body.

In this way, it is possible to achieve a high anti-vibration function and it is possible to prevent the pipe holding component from slipping in the width-wise direction of the clamp body.

On the upper part of the pipe holder of the pipe holding component, there are a pair of inclined portions which are inclined to the outer sides in the width-wise direction and a pair of planar plate portions having a planar shape on the lower part of the inclined portions; and the upper surface of the elastic connecting component has a pair of plate engaging portions; it is desirable that the pair of pair of plate engaging portions of the elastic connecting component be placed on the lower part of the pair of plate components of the pipe holding component.

In this way, it is possible to prevent the pipe holding component from slipping from the clamp body downwards.

A bottom portion wall is formed in part of the bottom portion of the elastic connecting component, and it is desirable that this bottom portion wall cover part of the base portion of the pipe holding component.

In this way, it is possible to prevent the pipe holding component from slipping from the elastic connecting component downwards.

The pipe held by the pipe holding component is held by the pipe support portion of the pipe holding component and the pipe contacting portion of the elastic connecting component, and it is desirable that it does not contact the clamp body.

In this way, it is possible to again prevent the vibration of the pipe from being transmitted to the body side panel.

The clamp body also has a pipe holder, and the pipe can be held in the pipe holder of the clamp body as well.

When the anti-vibration clamp is attached to a stud securely fixed to an attached component, it is desirable that only the stud locking portion of the clamp body abut the attached component.

In this way, it is possible to increase the anti-vibration function.

By means of the present invention, it is possible to offer an anti-vibration clamp with high joining strength between the structural parts, it being difficult for the pipe holding component which holds the pipe, the clamp body which attaches to the body panel and the elastic connecting component between them to slip.

Also, by means of the present invention, it is possible to offer an anti-vibration vibration clamp which can be molded simply without using equipment for insert molding or metallic molds.

Further, by means of the present invention, it is possible to offer an anti-vibration clamp in which the structural parts can be assembled simply without the use of assembly tools.

DETAILED DESCRIPTION OF THE PREFERRED EMBODIMENT OF THE INVENTION

Figure 1:
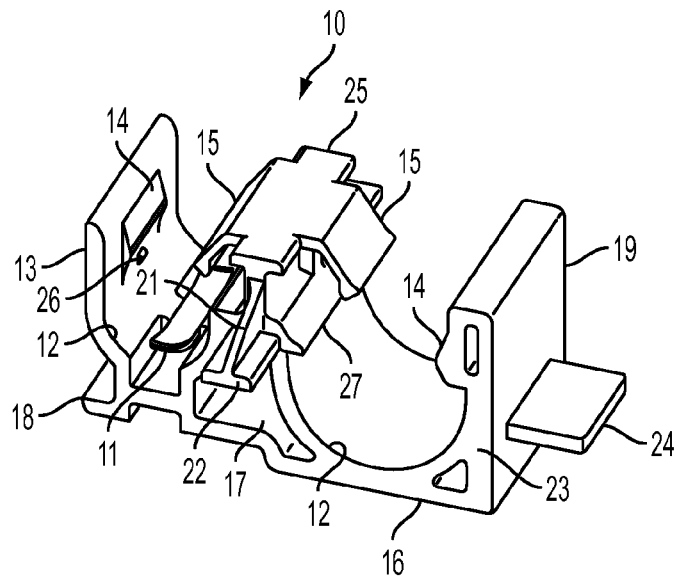
FIG. 1 is an oblique drawing of a pipe holding component according to an embodiment of the present invention.

In the following, an anti-vibration clamp 1 according to an embodiment of the present invention will be explained with reference to the drawings. Anti-vibration clamp 1 is provided with a pipe holding component 10 made from a hard resin, for holding a pipe or the like; a clamp body 30 made from a hard resin, for attaching to a body panel or the like; and an elastic connecting component 50 made from soft resin between the pipe holding component 10 and the clamp body 30. First, the pipe holding component 10 will be explained, referring to FIGS. 1-6. Next, the elastic connecting component 50 will be explained, referring to FIGS. 7-9. Then, clamp body 30 will be explained, with reference to FIGS. 10-18.

Following this, the operation for assembling the pipe holding component 10, main body clamp 30, and elastic connecting component 50, and the assembled anti-vibration clamp 1 will be explained with reference to FIGS. 19-23. Lastly, the appearance when the anti-vibration clamp is attached to a stud securely fixed on a body panel will be explained, with reference to FIG. 24.

Figure 21A:
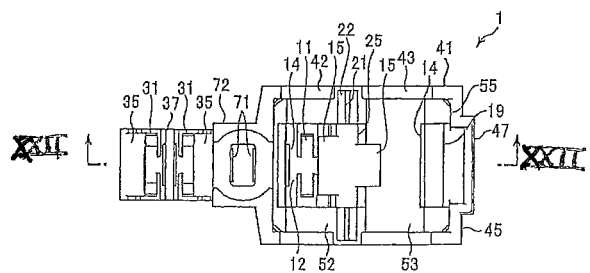
FIG. 21A is a top plan view of the anti-vibration clamp of FIG. 20.
Figure 21B:
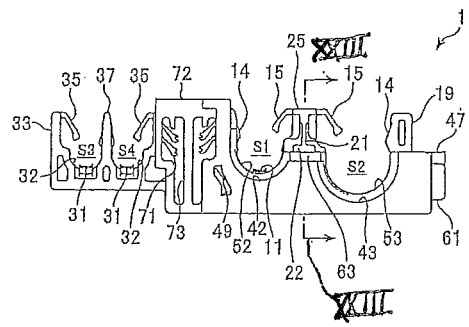
FIG. 21B is a front elevation of the anti-vibration clamp of FIG. 20.

In the explanation of the embodiment of the present invention, the up-and-down direction of FIG. 21B is called the up-and-down direction. The direction perpendicular to the pipe (the horizontal direction of 21B) is called the horizontal direction, and the direction parallel to the pipe (the up-and-down direction of 21A) is called the width-wise direction.

Figure 2A:
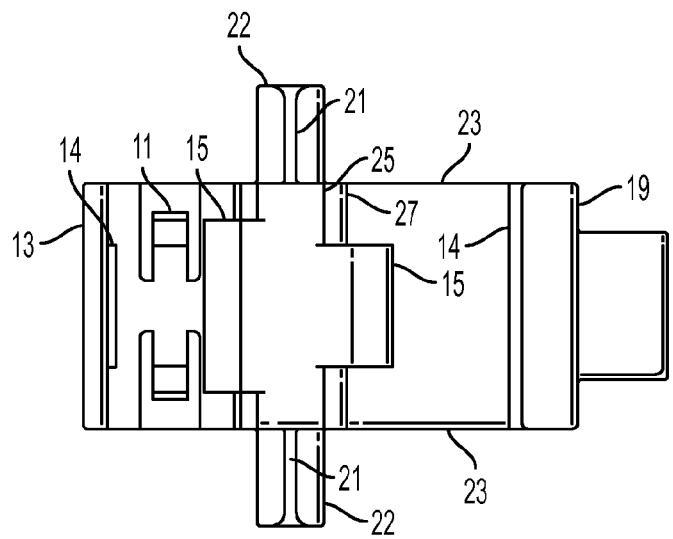
FIG. 2A is a top plan view of the pipe holding component of FIG. 1.
Figure 2B:
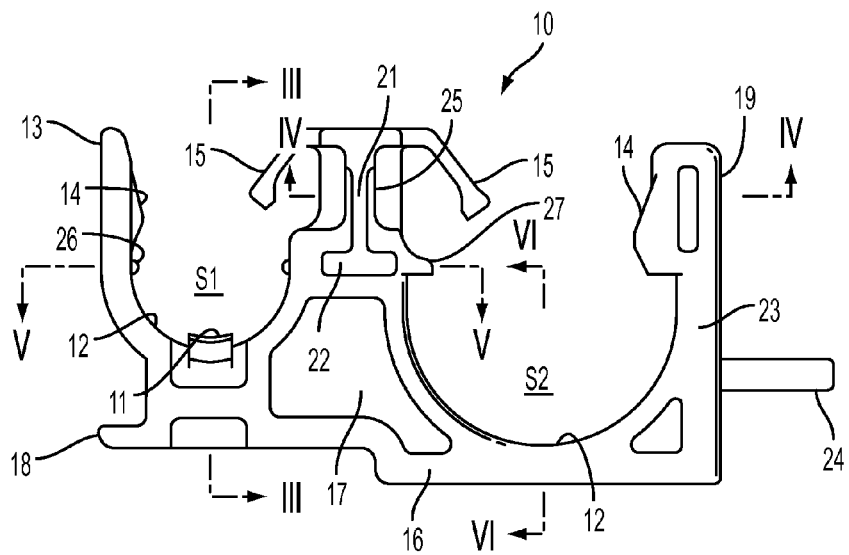
FIG. 2B is a front elevation of the pipe holding component of FIG. 1.
Figure 2C:
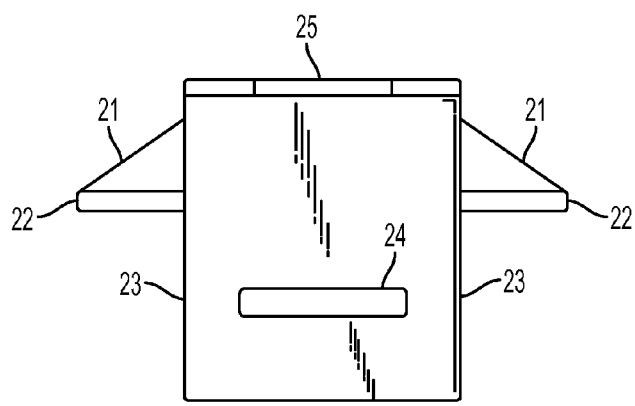
FIG. 2C is a right elevation of the pipe holding component of FIG. 1.

FIG. 1 is an oblique drawing of the pipe holding component 10. FIG. 2A is a top plan view of the pipe holding component 10 of FIG. 1. FIG. 2B is a front elevation view, and FIG. 2C is a right elevation view. Pipe holding component 10 is molded from a hard resin such as polyacetal (POM) or the like. Pipe holding component 10 is provided with a roughly rectangular planar base portion 16. The left-hand portion of base portion 16 is much higher than the right-hand portion. Elastic connecting component 50 enters at the bottom side of this left-hand side portion. A ridge 18 which projects in the horizontal direction is formed on the left end portion of base portion 16. Ridge 18 forms a locking means which engages with elastic connecting component 50.

On the upper part of base 16, there is a portion which holds various pipes such as a fuel pipe, brake fluid pipe, or the like. In this embodiment, the pipe holding component 10 has a pipe holder S1 on the upper portion of base plate 16, for holding one pipe P1 of medium thickness, and a pipe holder S2 for holding one pipe P2 which has a larger thickness than pipe P1. Pipe holders S1, S2 are formed in various configurations and sizes so as to hold various pipes such as fuel pipes and brake fluid pipes, and the like. The number, size and configurations of the pipe holders may be selected as desired to match the pipes which are held.

Figure 3:
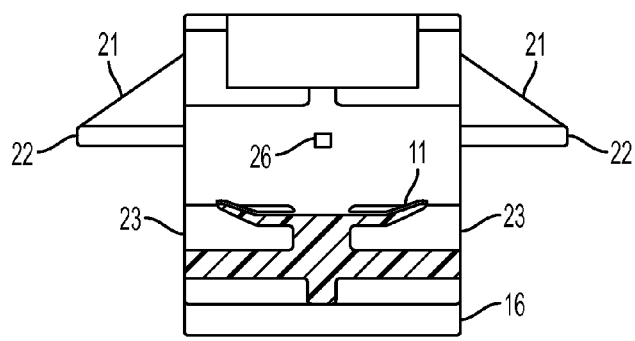
FIG. 3 is an III-III cross-section of 2B.

Pipe holder S1 is a U-shaped space for holding a long narrow item such a pipe or the like. In the central portion of the horizontal direction of S1, there is a pipe bottom support 11 for holding a pipe P1. The pipe bottom support 11 is curved with a diameter to match the radius of pipe P1 which is being held. Pipe bottom support 11 extends in the width-wise direction of pipe holding component 10. FIG. 3 is an III-III cross-section of FIG. 2B. Both sides of the width-wise direction of pipe bottom support 11 are bent slightly upwards so as to press on P1 with a pressing force.

Figure 5:
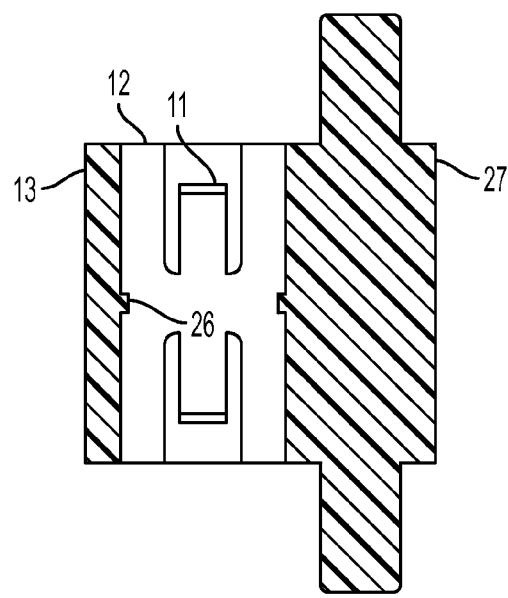
FIG. 5 is a V-V cross-section of 2B.
Figure 6:
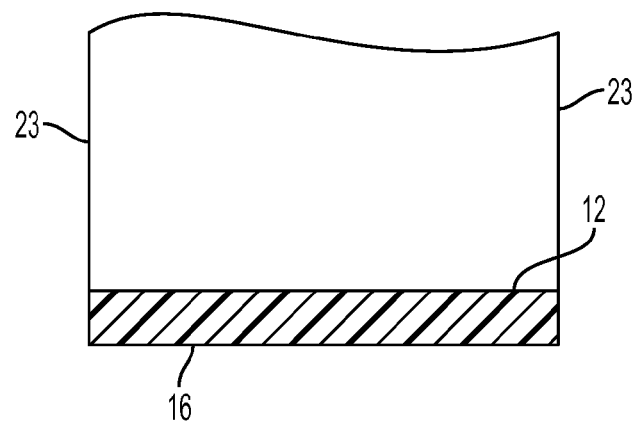
FIG. 6 is an VI-VI cross-section of 2B.

Both sides of the horizontal direction of pipe bottom support 11 are the pipe support 12 which is curved with a diameter which matches the radius of pipe P1, and the upper portion of the left-hand side of pipe support 12 becomes a perpendicular wall 13, and the sides of S1 extend in a roughly perpendicular direction. In the middle portion of the left-hand side perpendicular wall 13 there is a convex portion 14 which extends in the width-wise direction of pipe holding component 10 in order to press on the pipe when the pipe is contained. As shown in FIG. 1 and FIG. 5—which is a V-V cross-section of FIG. 2B—there is below convex portion 14 a protuberance 26 for holding the pipe in the central portion of the width-wise direction.

The upper portion of the right-hand side pipe support 12 has a boundary wall 25 between it and the pipe holder S2. An elastic holding tab 15 extends diagonally from the upper surface of boundary wall 25 in the direction of pipe holder S1. The elastic holding tab 15 holds the pipe P1 contained in pipe holder S1 from diagonally upwards.

When containing pipe P1 in the pipe holder S1, if pipe P1 is pressed from above in between the elastic holding tab 15 and the left-hand side perpendicular wall 13, the elastic holding tab 15 is bent and P1 is received. If pipe P1 is inserted far enough to abut pipe bottom support 11, elastic tab 15 returns to its original position, and pipe P1 is held, being pressed from diagonally upwards.

Pipe holding component 10 has a pipe holder S2 in order to hold a pipe P2 which is thicker than pipe P1 contained in pipe holder S1. As shown in FIG. 1 and in FIG. 6—which is an F-F cross-section of FIG. 2B—there is no pipe bottom support portion 11 in pipe holder S2, and a pipe support portion 12 is formed with a diameter curved to match the radius of pipe P2. Pipe support 12, from the lowest point connected to base portion 16, is curved with a diameter larger than the radius of pipe P2 contained on both sides, and as large as the thickness of the pipe contacting portion 53 of the elastic connecting component 50, which will be described later. On top of the portion where the diameter of the left-hand side of pipe support 12 is widest, a shelf portion 27 projects at the pipe holder S2 and extends in the width-wise direction. The lower surface of shelf portion is such that it presses down on the upper surface of pipe contacting portion 53 of the elastic connecting component 50. The boundary wall 25 extends from the shelf portion 27 upwards. The sides of pipe holder S2 extend in a roughly perpendicular direction. Elastic holding tab 15 extends diagonally from the upper surface of boundary wall 25 in the direction of the pipe holder S2. That is, elastic holding tab 15 extends in both directions of pipe holders S1 and S2 from the upper surface of boundary wall 25.

Figure 4:
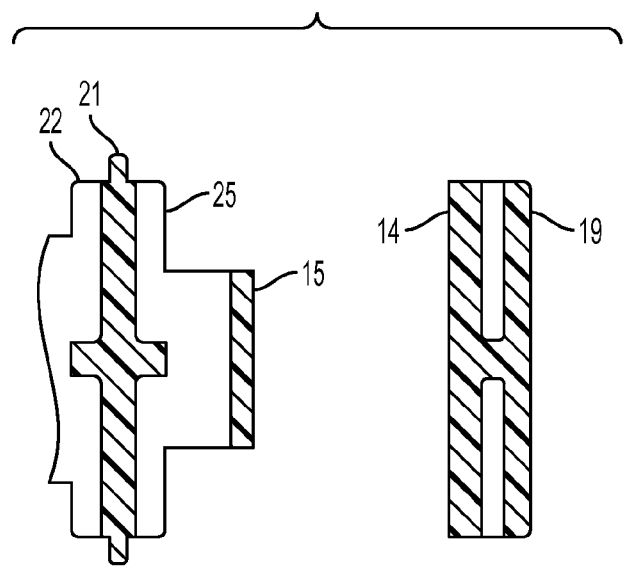
FIG. 4 is an IV-IV cross-section of 2B.

The right side of pipe support 12 is the end wall 19. A convex portion 14 is formed at the end wall 19 to press down on the pipe. The bottom surface of convex portion 14 is planar, and it is such that it presses down on the upper surface of pipe contacting portion 53 of the elastic connecting component 50. As shown in FIG. 4—which is an IV-IV cross-section of FIG. 2B—a space is formed between convex portion 14 and end wall 19, and convex portion 14 becomes easy to bend.

In containing pipe P2 in pipe holder S2, if P2 is pressed down between elastic holding tab 15 and convex portion 14 from above, elastic holding tab 15 is bent and pipe P2 is received. If pipe P2 is inserted far enough to abut pipe support portion 12, elastic holding tab 15 returns to its original position, and pipe P2 is held, being pressed from diagonally upwards.

The number of pipe holders S1 for holding a pipe P1 of moderate thickness, and pipe holders S2 for holding a thick pipe S2 may be suitably selected according to the use.

The lower portion of the boundary wall 25 between pipe holder S1 and pipe holder S2 is a vacant portion 17 which is vacant. The top of boundary wall 25 is planar. As shown in FIG. 2C, from both sides of the top of boundary wall 25 in the width-wise direction, a pair of inclined portions 21 are formed whose width grows wider downwards. A pair of plates 22 are formed which project in the width-wise direction at the lower part of the inclined portions 21. As will be explained later, the elastic connecting component pushes out and widens along the inclined portions 21 and the elastic connecting component 50 and the plates 22 being engaged, it is possible to engage the pipe holding component 10 at the elastic connecting component 50.

On the bottom side surface of the right-hand side end wall 19 of pipe holding component 10, a planar holding rib 24 is formed for engaging with the elastic connecting component 50. Holding rib 24 engages with the holding rib aperture 62 of the elastic connecting component 50. As shown in FIG. 2A, the base portion 16 of pipe holding component 10, the pipe support 12, and the perpendicular wall 13 have a fixed length in the width-wise direction and the end surface of the width-wise direction of these parts become a pair of side surfaces 23. In FIG. 1, although reference number 23 indicates the side surface of end wall 19, side surface 23 is the side surface of base portion 16, pipe support 12, perpendicular wall 13 and end wall 19.

Figure 7:
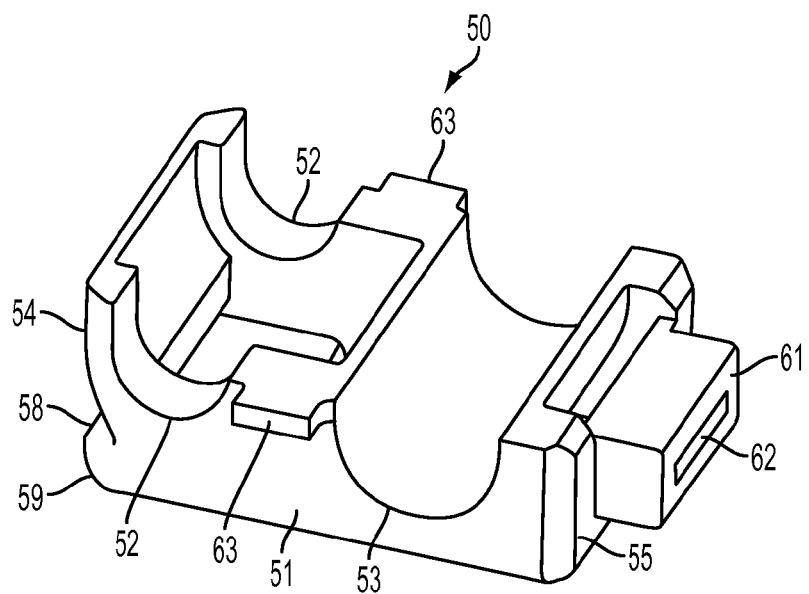
FIG. 7 is an oblique drawing of the elastic connecting component according to an embodiment of the present invention.
Figure 8A:
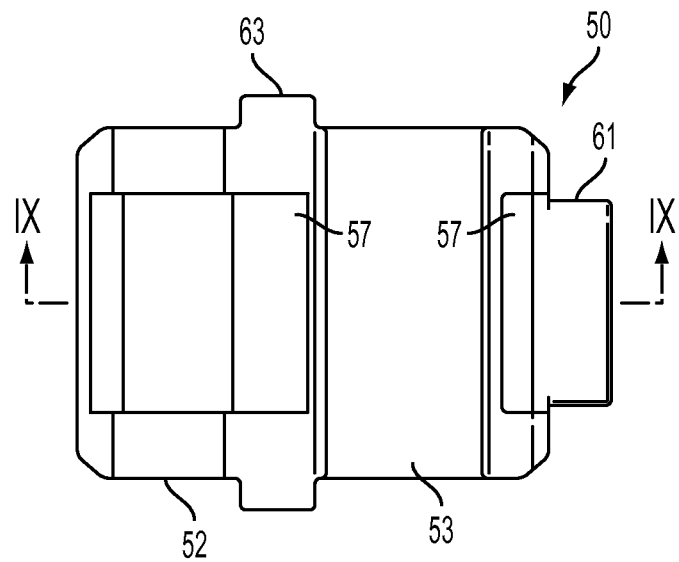
FIG. 8A is a top plan view of the elastic connecting component of FIG. 7.
Figure 8B:
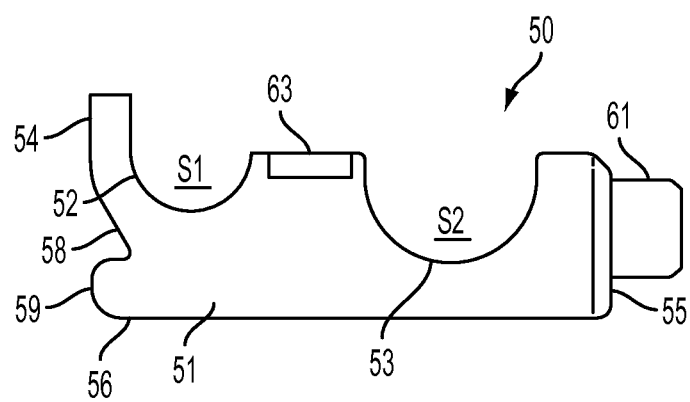
FIG. 8B is a front elevation of the elastic connecting component of FIG. 7.
Figure 8C:
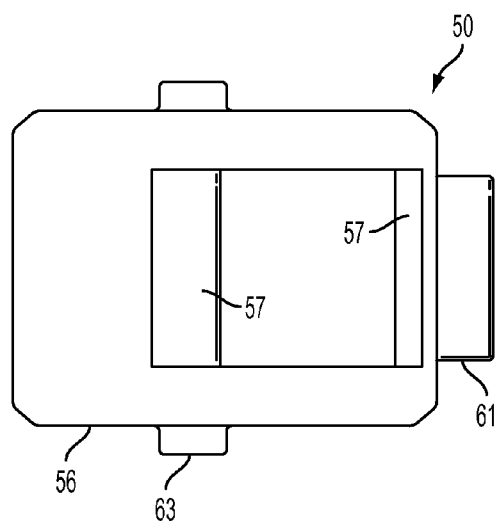
FIG. 8C is a bottom plan view of the elastic connecting component of FIG. 7.
Figure 8D:
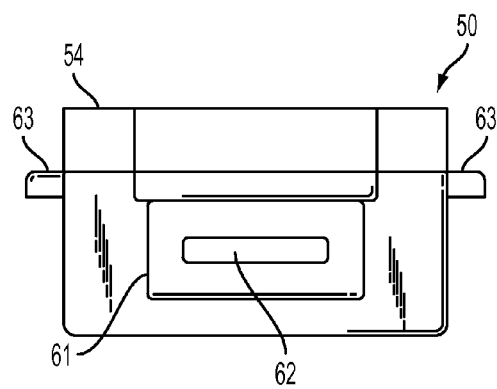
FIG. 8D is a right elevation of the elastic connecting component of FIG. 7.
Figure 9:
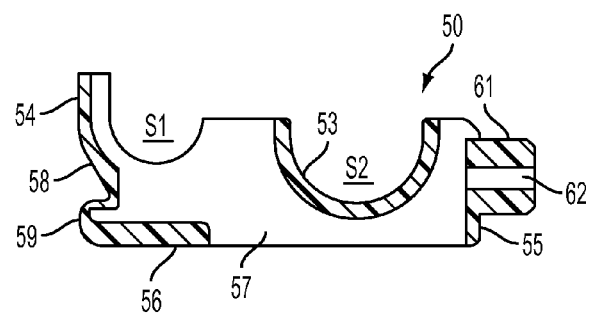
FIG. 9 is an IX-IX cross-section of FIG. 8A.

FIG. 7 is an oblique drawing of the elastic connecting component 50 according to an embodiment of the present invention. FIG. 8A is a top plan view of the elastic connecting component 50 of FIG. 7, FIG. 8B is a front elevation, FIG. 8C is a bottom plan view, and FIG. 8D a right elevation view. FIG. 9 is an IX-IX cross-section of FIG. 8A. The elastic connecting component 50 is formed from a soft resin having an anti-vibration function, for example, a thermoplastic elastomer (TPE.) By means of laying down the elastic connecting component 50 on the pipe holding component 10 and attaching to clamp body 30, it is possible to achieve a function such that vibration is not transmitted between the pipe holding component 10 and the clamp body 30.

The elastic connecting component 50 has side walls 51 on both sides of the width-wise direction of elastic connecting component 50, and end wall 54 on the left-hand side in the horizontal direction, and an end wall 55 on the right-hand side in the horizontal direction. A U-shaped pipe contacting portion 52 is formed at the position corresponding to pipe holder S1. Pipe contacting portion 52 is formed on both sides in the width-wise direction, and the portion between is vacant. A U-shaped pipe contacting portion 53 is formed at the position corresponding to pipe holder S2. Pipe contacting portion 53 is formed from the end in the width-wise direction to the end. A groove 58 which extends in the width-wise direction is formed in the lower portion of end wall 54. This groove 58 forms a locking means which locks so that elastic connecting component 50 does not slip out of clamp body 30.

The bottom side of groove 58 is a curved portion 59 which is curved. Ridge 18 of pipe holding component 10 is contained in curved portion 59, forming a locking means which locks so that pipe holding component 10 and elastic connecting component 50 do not slip.

As shown in FIG. 9—which is an IX-IX cross-section of FIG. 8A—a bottom wall 56 extends in the horizontal direction from the curved portion 59 of the left-hand side. Bottom wall 56 is placed on the bottom side of the portion which is much higher, on the left-hand side portion of the base portion 16 of the pipe holding component 10. Bottom wall 56 has a holding function so that the pipe holding component 10 and the elastic connecting component 50 do not slip in the up-and-down direction. The right-hand side of bottom wall 56 becomes a vacant portion 57, and the boundary wall 25 of the central portion of pipe holding component 10 is contained in vacant portion 57.

A holding rib containing portion 61 is formed in the central portion of the end wall 55 of the right-hand side, and in order to contain the holding rib 24 of the pipe holding component 10 in the central portion of the holding rib containing portion 61, a holding rib aperture 62 which conforms to the shape of holding rib 24 is formed. By containing the holding rib 24 of the pipe holding component 10 in the holding rib aperture 62, the elastic connecting component 50 is held so that it does not slip from the pipe holding component 10. An aperture portion is formed in the central portion of the upper part of end wall 55 so that end wall 19 of pipe holding component 10 can pass through this aperture portion.

A pair of plate engaging portions 63 are formed between pipe contacting portion 52 and pipe contacting portion 53, and it becomes possible to engage these with the bottom surface of the planar portion 22 of pipe holding component 10. By means of engaging the planar portion 22 of pipe holding component 10 with the plate engaging portion 63, it is possible to hold it so that the elastic connecting component 50 does not slip upwards from the pipe holding component 10, and, moreover, vibrations are not transmitted.

Figure 19A:
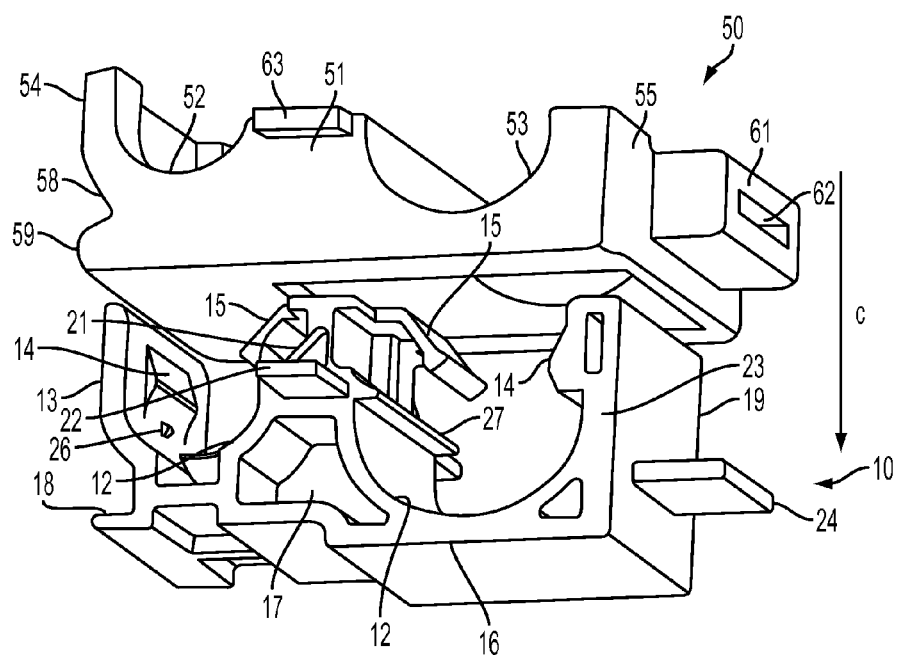
FIG. 19A is an oblique drawing which shows the appearance of the pipe holding component and the elastic connecting component before assembly.
Figure 19B:
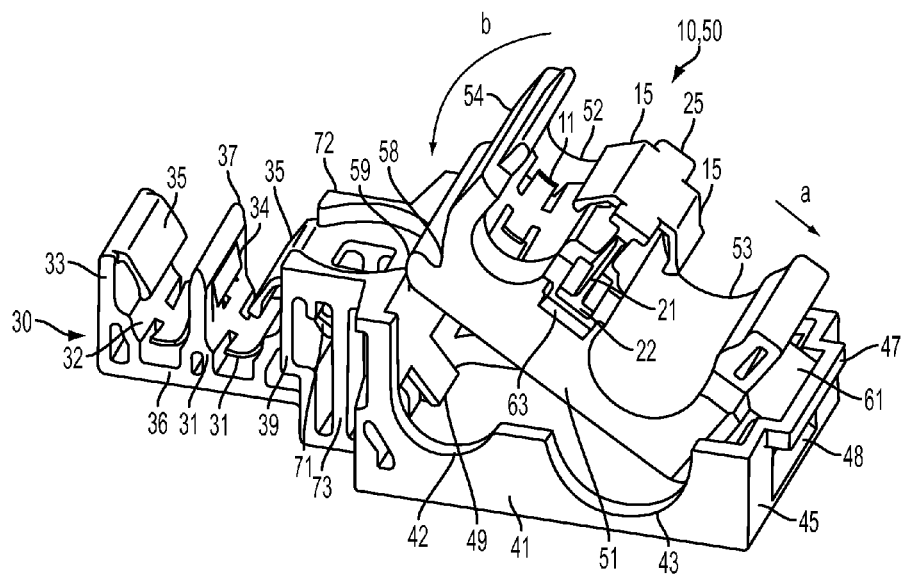
FIG. 19B is an oblique drawing which shows the appearance when the pipe holding component and the elastic connecting component are assembled and inserted into the clamp body.
Figure 19C:
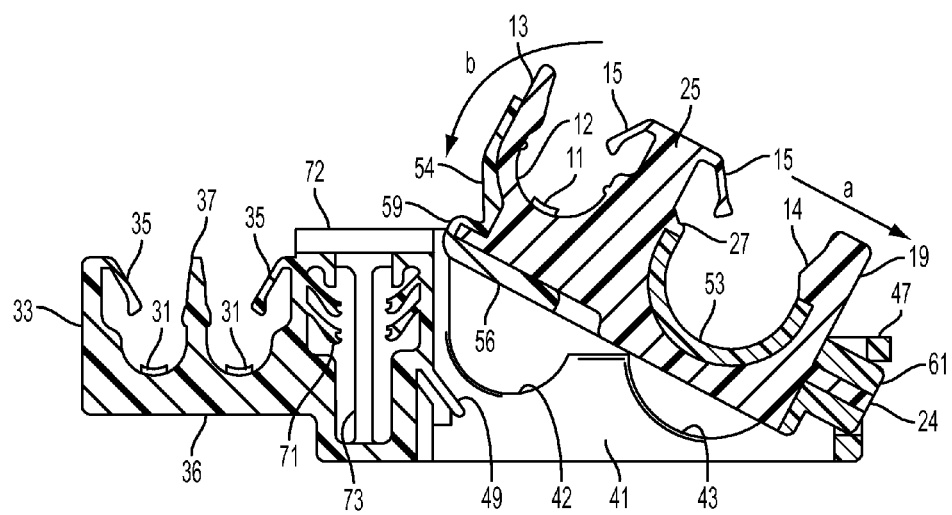
FIG. 19C is a cross-section of FIG. 19B.

Referring to FIGS. 19A and 19C, when pipe holding component 10 and the elastic connecting component 50 are in the assembled form, the perpendicular wall 13 of the pipe holding component 10, abuts the inner side of end wall 54 of the elastic connecting component 50, and ridge 18 of pipe holding component 10 is contained on the inner side of the curved portion 59 of elastic connecting component 50. Boundary wall 25 of pipe holding component 10 passes through the vacant portion 57 of elastic connecting component 50 and out to the upper portion.

Now referring to FIGS. 19B and 19C, pipe bottom support 11 and pipe support 12 of the left-hand side in the horizontal direction of pipe holding component 10, enter between a pair of pipe contacting portions 52 which are opposite in the width-wise direction of elastic connecting component 50. Pipe P1 is supported by pipe bottom support 11 and pipe support 12 and a pair of pipe contacting portions 52. Pipe support 12 of the right-hand side of the horizontal direction of pipe holding component 10 is covered by the pipe contacting portion 53 of elastic connecting component 50, and pipe P2 is supported by pipe contacting portion 53 of elastic connecting component 50.

End wall 19 of pipe holding component 10 projects upwards and outwards from the vacant space between the pipe contacting portion 53 of elastic connecting component 50 and the holding rib containing portion 61. Holding rib 24 of pipe holding component 10 is contained in the holding rib aperture 62 of the elastic connecting component 50. A pair of side surfaces 23 of pipe holding component 10 are placed between the two side walls 51 of elastic connecting component 50.

Figure 10:
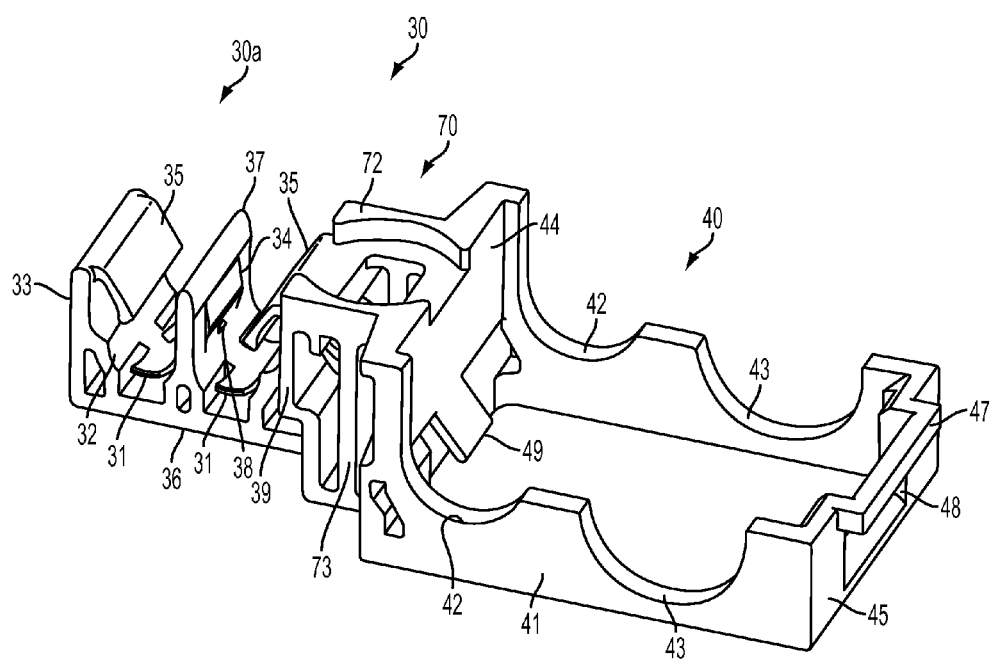
FIG. 10 is an oblique drawing of the clamp body according to an embodiment of the present invention.
Figure 11A:
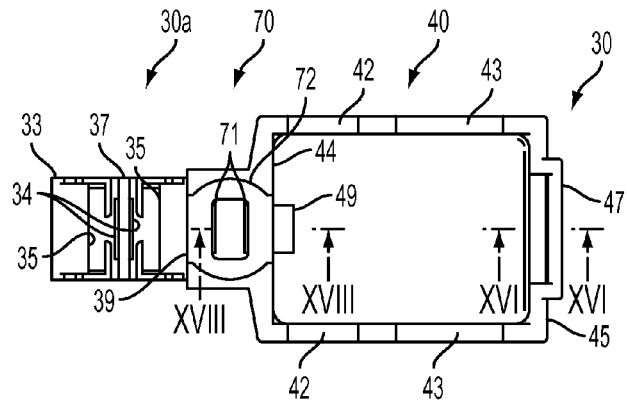
FIG. 11A is a top plan view of the clamp body of FIG. 10.
Figure 11B:
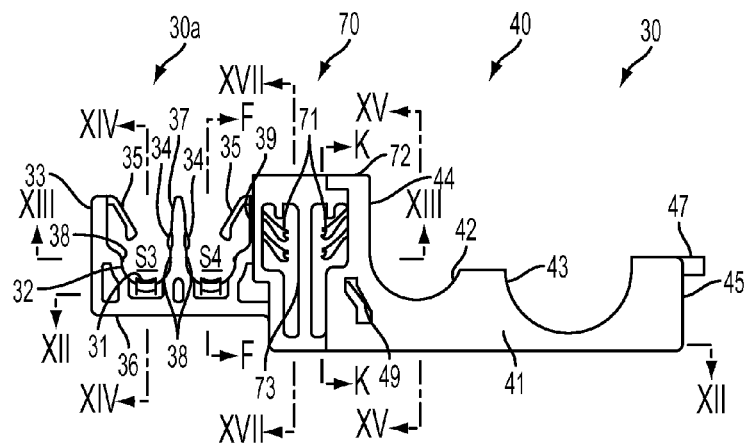
FIG. 11B is a front elevation of the clamp body of FIG. 10.
Figure 11C:
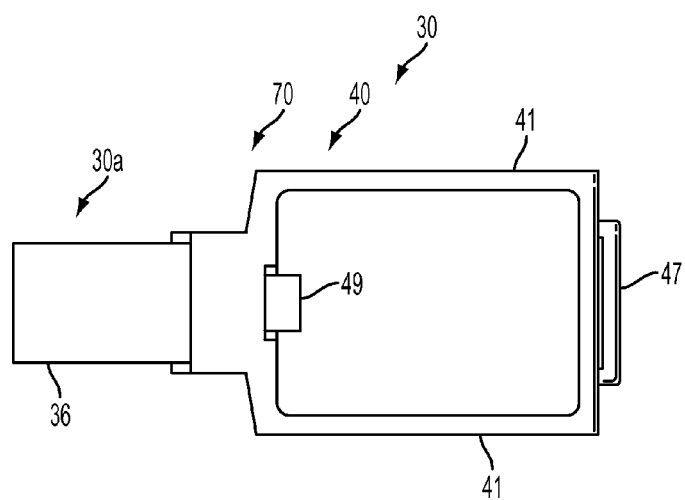
FIG. 11C is a bottom plan view of the clamp body of FIG. 10.
Figure 11D:
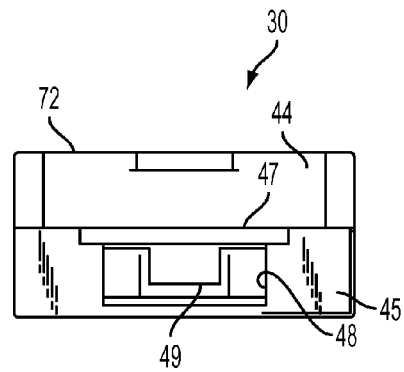
FIG. 11D is a right elevation of the clamp body of FIG. 10.

FIG. 10 is an oblique drawing of clamp body 30. FIG. 11A is a top plan view of the clamp body 30, FIG. 11B is a front elevation view, FIG. 11C is a bottom plan view, and FIG. 11D is a right elevation view. Clamp body 30 has a stud locking portion 70 for locking the central portion of clamp body 30 to a stud attached to the side of a car body; a left-hand side pipe attaching component 30a; and a right-hand side floating attachment component 40. Because pipe attaching component 30a attaches directly to a small diameter pipe, it has slight pipe vibration attenuating function. In the floating attachment portion 40, because the pipe holding component 10 is attached through the elastic connecting component 50, the pipe vibration attenuating function is excellent. Clamp body 30 is formed from a hard resin such as polyacetal (POM) or the like.

Figure 14:
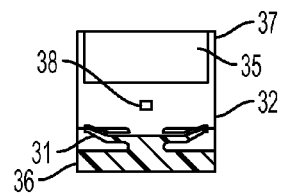
FIG. 14 is an XIV-XIV cross-section of FIG. 11B.
Figure 22:
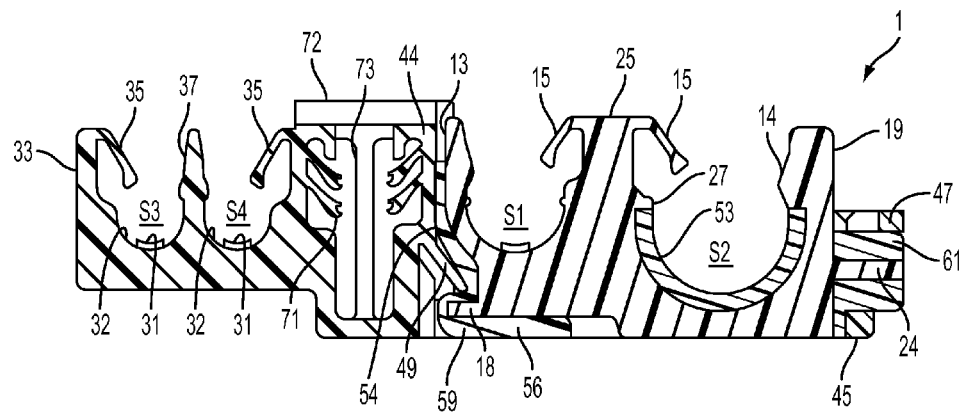
FIG. 22 is an XXII-XXII cross-section of FIG. 21A.
Figure 24:
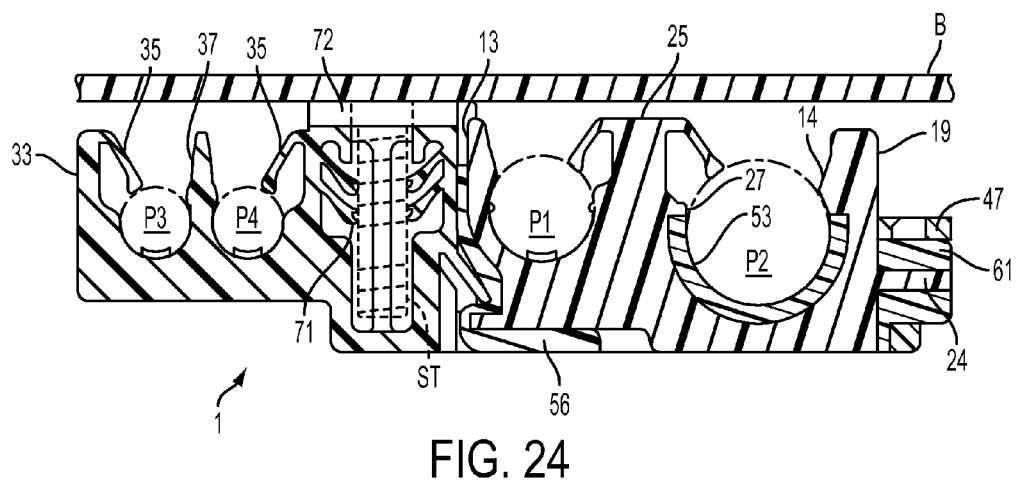
FIG. 24 is the same cross-section as in FIG. 22, and shows the appearance when the anti-vibration clamp is assembled on a stud securely fixed to a body panel.

Referring to FIGS. 22 and 24, two pipe holders S3 and S4 for holding narrow pipes P3, P4 are formed in the pipe attaching portion 30a of clamp body 30. Pipe attaching portion 30a has a roughly rectangular base portion 36 in the bottom portion. Pipe holder S3 has a pipe bottom support 31 in its central portion for supporting P3. Pipe bottom support 31 is curved with a diameter which conforms to the radius of pipe P3 which is contained. Pipe bottom support 31 extends in the width-wise direction of clamp body 30. FIG. 14 is an XIV-XIV cross-section of FIG. 11B. Both sides in the width-wise direction of pipe bottom support 31 curve slightly upwards so that the pipe is pressed with a pressing force.

Both sides in the horizontal direction of pipe bottom support 31 are pipe supports 32 which are curved with a diameter that conforms to the radius of P3. The left-hand side of pipe holder S3 is end wall 33, and the sides of pipe holder S3 extend roughly in the perpendicular direction. The right hand side of pipe holder S3 is middle wall 37. The middle portion of middle wall 37 has a convex portion 34 for pressing down on pipe P3 when pipe P3 is contained. Elastic holding tab 35 extends diagonally from the top end portion of end wall 33 in the direction of pipe holder S3. Elastic holding tab 35 holds pipe P3 from the diagonally upwards direction. A pair of protuberances 38 are placed where the width of pipe support 32 is widest. Protuberance 38 has the function of holding P3 from the left and the right, when P3 is held in pipe holder S3.

In containing narrow pipe P3 in pipe holder S3, when P3 is pushed between elastic holding tab 35 and middle wall 37, elastic holding tab 35 is bent, and P3 is received. If P3 is inserted until it abuts pipe bottom support 31, elastic holding tab 35 returns to its original position and pipe P3 is held in pipe holder S3, being pressed down from the diagonally upwards direction.

Pipe holder S4 has a shape with left and right symmetry to pipe holder S3, and an explanation of pipe holder S4 will be omitted. The boundary of pipe holder S4 and stud locking portion 70 is middle wall 39.

Figure 15:
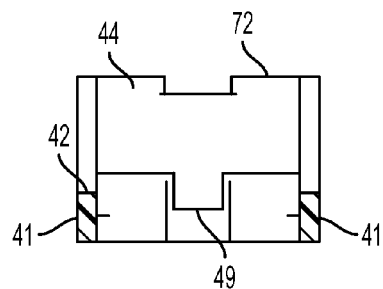
FIG. 15 is a XV-XV cross-section of FIG. 11B.

The floating attachment portion 40 of clamp body 30 is the part which attaches the pipe holding component 10 though the elastic connecting component 50. As shown in FIG. 11C, which is a bottom plan view and in FIG. 12—which is a XII-XII cross-section of FIG. 11B—the bottom surface of floating attachment portion 40 is a vacant space, and pipe holding component 10 and elastic connecting component 50 enter this portion which is vacant. As shown in FIG. 15—which is a XV-XV cross-section of FIG. 11B—floating attachment portion 40 has a pair of side walls 41 which are opposite in the width direction. A pair of side walls 51 of elastic connecting component 50 enters between side walls 41. A semicircular pipe passage 42 and a pipe passage 43 are formed in side walls 41. Pipe support 12 of pipe holding component 10 and the pipe contacting portion 52 of the elastic connecting component 50 of both sides of its width direction enter between the pair of pipe passages 42. Pipe support 12 of pipe holding component 10 and the pipe contacting portion 53 overlap between the pair of pipe passages 43.

At the left end of side wall 41, there is a middle wall 44. Middle wall 44 is the wall for the boundary of floating attachment portion 40 and stud locking portion 70. In the lower part of the central portion of middle wall 44, there is a lock bar 49 which extends diagonally downwards. If elastic connecting component 50 is inserted in clamp body 30, lock bar 49 engages in groove 58 of elastic connecting component 50 forming a locking means which locks so that the curved portion 59 of elastic connecting component 50 and ridge 18 of pipe holding component 10 do not slip from clamp body 30.

Figure 16:
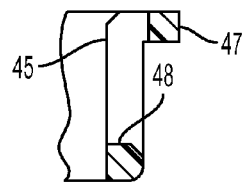
FIG. 16 is an XVI-XVI cross-section of FIG. 11A.

The right end portion of side wall 41 is the end portion of clamp body 30, and is end wall 45. As shown in FIG. 16—which is an XVI-XVI cross-section of FIG. 11A—a crank 47 which projects towards the direction of the right is formed on the top of end wall 45; and a rectangular holding rib aperture 48 is formed below crank 47. Locking can be done by inserting holding rib 24 of pipe holding component 10 and holding rib containing portion 61 of elastic connecting component 50 in the holding rib insertion aperture 48. Holding rib insertion aperture 48 forms the locking means.

Figure 12:
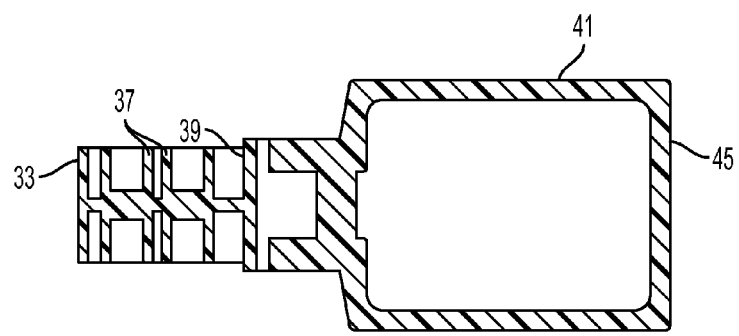
FIG. 12 is a XII-XII cross-section of FIG. 11B.
Figure 13:
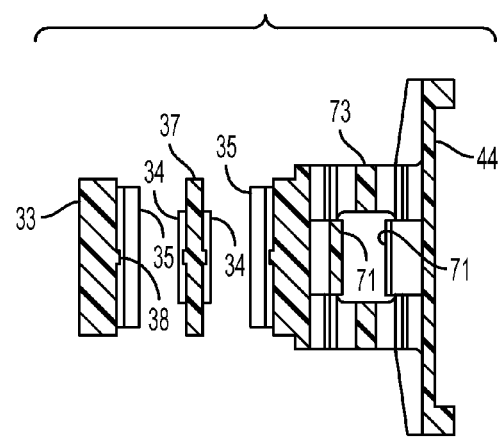
FIG. 13 is a XIII-XIII cross-section of FIG. 11B.

A stud locking portion 70 is placed at the central portion between pipe attaching portion 30a of clamp body 30 and floating attachment 40, for locking clamp body 30 at the stud ST attached to the car body side (See FIG. 24). As shown in FIG. 12—which is a XII-XII cross-section of FIG. 11B—and FIG. 13—which is the XIII-XIII cross-section —, the width of stud locking portion 70 is less than the width of the floating attachment portion 40. The stud locking portion 70 of the present embodiment is the type which locks at a stud ST which hangs down from a body panel of the upper portion of a car.

The upper surface of the stud locking portion 70 is a ridge 72 in which the outer periphery is much higher, and the central portion is much lower. Only the ridge 72 contacts the body panel and is such that it is difficult for the pipe vibration to be transmitted to the body panel. A rim 73 which extends up-and-down is formed on both end portions in the width direction of the stud locking portion 70 to increase the strength of the stud locking portion 70.

Figure 17:
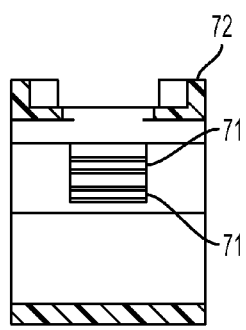
FIG. 17 is a XVII-XVII cross-section of FIG. 11B.
Figure 18:
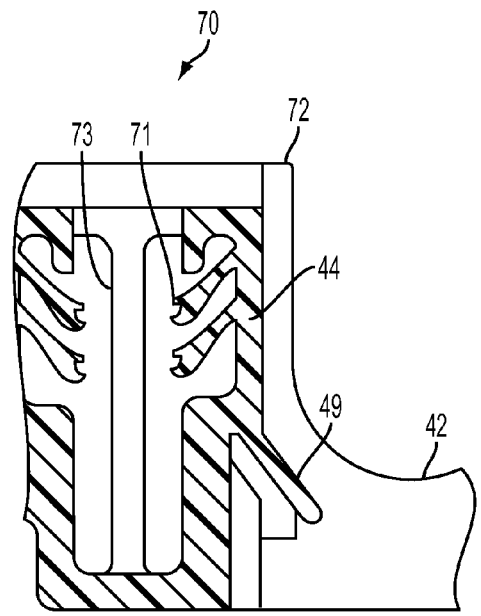
FIG. 18 is an XVIII-XVIII cross-section of FIG. 11A.

Stud locking portion 70 has a locking hook 71 which engages with a screw thread of stud ST. As shown in FIG. 18—which is an XVIII-XVIII cross-section of FIG. 11A—locking hook 71 extends diagonally downward from middle wall 39 and middle wall 44. Locking hook 71 is placed in the diagonal direction so as to lock from both directions of stud ST. The opposite locking hook 71 has a different height in order to match the difference in height of the screw thread of stud ST. As shown in FIG. 17—which is a XVII-XVII cross-section of FIG. 11B—locking hook 71 extends in the width direction. Although there are two pairs of locking hooks 71 in the present embodiment, the number of locking hooks 71 is not limited to two pairs.

Conversely, the present embodiment can be of the type which locks to a stud which extends from low to high. In this case, locking hook 71 extends from below in a diagonally upward direction. The means for attaching the clamp body 30 to the side of a car body is not limited to locking to a stud by means of locking hook 71. The clamp body 30 may be attached to the side of a car body by other known means such as an anchor leg clip, or the like.

The procedure will be explained in which pipe holding component 10 and elastic connecting component 50 are assembled, and the assembled unit of the pipe holding component 10 and elastic connecting component 50 are then inserted in the clamp body 30. FIG. 19A shows the pipe holding component 10 and elastic connecting component 50 before assembly, and is an oblique drawing showing the appearance when elastic connecting component 50 is placed on the upper portion of pipe holding component 10. FIG. 19B is an oblique drawing which shows pipe holding component 10 and elastic connecting component 50 assembled and inserted in clamp body 30. FIG. 19C is a cross-section of FIG. 19B.

Referring to FIG. 19A, from what is shown in FIG. 19A, elastic connecting component 50 will be moved in the direction of arrow C to the bottom towards pipe holding component 10. Perpendicular wall 13 of the left-hand side of pipe holding component 10 enters the upper side of bottom wall 56 from the vacant portion 57 of elastic connecting component 50, and perpendicular wall 13 is pushed onto and attached to the inner side of end wall 54 of elastic connecting component 50. End wall 19 of pipe holding component 10 exits to the top portion from an aperture on the top of the inner side of end wall 55 of elastic connecting component 50.

Ridge 18 of the pipe holding component 10 enters curved portion 59 of elastic connecting component 50. The inclined portion 21 of pipe holding component 10 abuts a pair of side walls 51 of elastic connecting component 50, and the pair of side walls 51 of elastic connecting component 50 becomes wider. A plate engaging portion 63 enters below a pair of plate portions 22 of pipe holding component 10. Boundary wall 25 of pipe holding component 10 exits on the upper portion of elastic connecting component 50. Holding rib 24 of pipe holding component 10 abuts end wall 55 of elastic connecting component 50. When ridge 18 of pipe holding component 10 has entered curved portion 59 of elastic connecting component 50, elastic connecting component 50 is drawn out in the horizontal direction, and holding rib 24 enters into the holding rib aperture 62 of elastic connecting component 50. The left and right upper end portions of pipe contacting portion 53 of elastic connecting component 50 abut the lower surface of shelf portion 27 and the lower surface of the convex portion 14, respectively.

Thus, the pipe holding component 10 and the elastic connecting component 50 are assembled. Ridge 18 of the pipe holding component 10 engages with the curved portion 59 of the elastic connecting component 50, and because holding rib 24 engages with the holding rib aperture 62 of elastic connecting component 50, it does not slip to the sideways direction.

Bottom wall 56 of elastic connecting component 50 is placed at the bottom side of the left-hand side portion of base 16 of pipe holding component 10. Also, because a pair of plate portions 22 of pipe holding component 10 engage below a pair of plate engagement portions 63 of elastic connecting component 50, it is difficult for it to slip in the up-and-down direction.

Next, an assembled unit with the pipe holding component 10 and the elastic connecting component 50 assembled will be inserted into the clamp body 30. FIG. 19B is an oblique drawing which shows the appearance of an assembled pipe holding component 10 and elastic connecting component 50 inserted in clamp body 30. FIG. 19C is a cross-section of what is shown in FIG. 19B.

The assembled unit of the pipe holding component 10 and elastic connecting component 50 will be moved in the direction arrow a of FIG. 19C. The holding rib containing aperture 61 of elastic connecting component 50 in which holding rib 24 of pipe holding component 10 has entered catches on the crank 47 of clamp body 30 and enters the rib insertion aperture 48 which is below.

Next, the assembled unit of the pipe holding component 10 and elastic connecting component 50 will be rotated in the direction of arrow b. A pair of side walls 51 of the elastic connecting component 50 enters into the inner side of a pair of side walls 41 of clamp body 30.

Curved portion 59 of elastic connecting component 50 into which ridge 18 of pipe holding component 10 has entered presses down on lock bar 49 of clamp body 30; and lock bar 49 being bent, if curved portion 59 enters below lock bar 49, lock bar 49 returns to its original position; and lock bar 49 being locked in groove 58, ridge 18 and curved portion 59 are locked so they do not slip. Thus, the assembled unit is securely fixed to clamp body 30.

Figure 20:
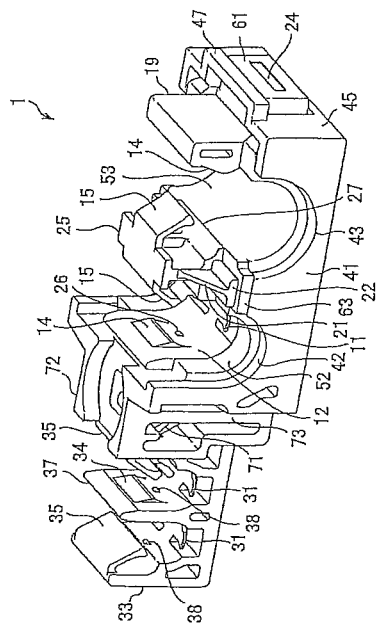
FIG. 20 is an oblique drawing which shows the anti-vibration clamp in a completed state with the pipe holding component and the elastic connecting component inserted in the clamp body.
Figure 21C:
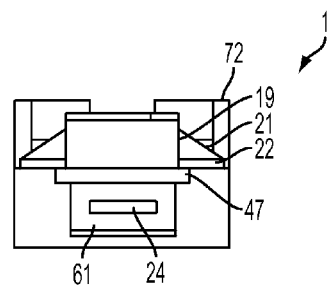
FIG. 21C is a right elevation of the anti-vibration clamp of FIG. 20.

FIG. 20 is an oblique drawing which shows the appearance of a completed anti-vibration clamp, the pipe holding component 10 and the elastic connecting component 50 being assembled and inserted into clamp body 30. FIG. 21A is a top plan view of the anti-vibration clamp; FIG. 21B is a front elevation view; and FIG. 21C is a right elevation view. Pipe contacting portion 52 of elastic connecting component 50 is much higher than pipe passage 42 of clamp body 30, so that pipe passage 42 does not come in contact with pipe P1. A pair of pipe contacting portions 52 of elastic connecting component 50 is approximately the same height as the pipe bottom support 11 of pipe holding component 10 between these. The surface which receives pipe P1 of pipe holder S1 is the pair of pipe contacting portions 52 of elastic connecting component 50, the pipe bottom support 11 of pipe holding component 10 between these and pipe support 12. Pipe P1 is pressed down by elastic holding tab 15 and convex portion 14.

Pipe contacting portion 53 of elastic connecting component 50 is much higher than pipe passage 43 of clamp body 30 so that pipe passage 43 does not come in contact with P2. The surface which receives P2 of pipe holder S2 is pipe contacting portion 53 of elastic connecting component 50. Pipe P2 is pressed down by elastic holding tab 15 and convex portion 14.

In holding a medium-sized pipe P1 in pipe holder S1, when pipe P1 is pressed from above in between the elastic holding tab 15 and perpendicular wall 13, elastic holding tab 15 is bent, and pipe P1 is received. If P1 is pushed and inserted far enough to abut bottom support 11, elastic holding tab 15 returns to its original position and pipe P1 is held in pipe holder S1 being pressed down from the diagonally upward direction.

In holding a thick pipe P2 in pipe holder S2, when pipe P2 is pressed down from above in between the elastic holding tab 15 and convex portion 14, elastic holding tab 15 is bent, and pipe P2 is received. If P2 is pushed and inserted far enough to abut bottom support 12, elastic holding tab 15 returns to its original position and pipe P2 is held in pipe holder S2 being pressed down from the diagonally upward direction.

Pipe holders S3, S4 receive pipes P3, P4 with pipe bottom support 31 and pipe support 32 of clamp body 30. Pipes P3, P4 are pressed down by the elastic holding tab 35 and convex portion 34. Pipe holders S3, S4 being formed in the clamp body 30 have no pipe vibration attenuating function.

Figure 23:
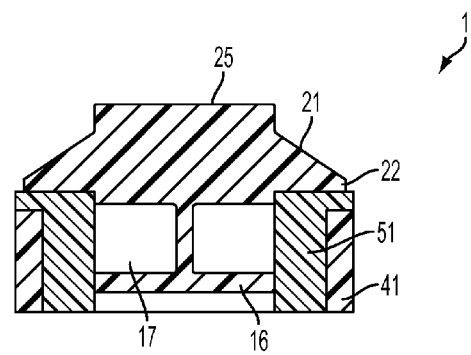
FIG. 23 is a XXIII-XXIII cross-section of FIG. 21B.

FIG. 22 is an XXII-XXII cross-section of FIG. 21A. FIG. 23 is a XXIII-XXIII cross-section of FIG. 21B. As shown in FIG. 22, an end wall 54 of elastic connecting component 50 is interposed between the perpendicular wall 13 of pipe holding component 10 and the middle wall 44 of clamp body 30. A holding rib containing portion 61 of elastic connecting component 50 is interposed between the holding rib 24 of pipe holding component 10 and the end wall 45 of clamp body 30. Pipe holding component 10 and clamp body 30 becomes a floating clamp which does not come in direct contact.

Ridge 18 of pipe holding component 10 is securely fixed by lock bar 49 of clamp body 30 through curved portion 59 of elastic connecting component 50. Holding rib 24 of pipe holding component 10 is joined to the holding rib insertion aperture 48 of clamp body 30 through the holding rib containing aperture 61 of elastic connecting component 50. For this reason, pipe holding component 10 does not move in the sideways or up-and-down direction, and it is difficult for it to slip from the clamp body 30.

As shown in FIG. 23, a side wall 51 of elastic connecting component 50 is interposed between boundary wall 25 of pipe holding component 10 and side wall 41 of clamp body 30. In cross-sections other than the cross-section shown in FIG. 23 as well, a side wall 51 is interposed between side surface 23 in the width-wise direction of pipe holding component 10 and side wall 41 of clamp body 30. Pipe holding component 10 and clamp body 30 form a floating clamp which does not come in direct contact. For this reason, the vibration attenuating efficacy is high. Boundary wall 25 of pipe holding component 10 is held from both sides by means of side wall 41, through side wall 51 of elastic connecting component 50. For this reason, pipe holding component 10 does not move in the width-wise direction, and it is difficult for it to slip from clamp body 30.

FIG. 24 is the same cross-section as in FIG. 22 and shows the appearance of anti-vibration clamp 1 holding pipes P1-P4 attached from below to a stud ST securely fixed to a body panel. Pipe P1 is held in pipe holder S1 and pipe P2 is held in pipe holder S2. Ridge 72 of stud locking portion 70 of clamp body 30 is in a position higher than the upper surface of perpendicular wall 13 of pipe holding component 10, the upper surface of boundary wall 25 or the upper surface of end wall 19. For this reason, pipe holding component 10 opens a space from the body panel B above.

Pipe P3 is held in pipe holder S3 and pipe P4 is held in pipe holder S4. Ridge 72 of stud locking component 70 is in a position higher than the top of end wall 33 of clamp body 30 and the top of middle wall 37. For this reason, pipe attaching portion 30a opens a space from the body panel B above. Because anti-vibration clamp 1 contacts body panel B with only the stud locking component 70, it is difficult for the vibration of pipes P3, P4—which are held in pipe attaching portion 30a—and the vibration of pipes P1, P2—which are held in pipe holding component 10—to be transmitted to body panel B.

According to an embodiment of this invention, pipe holding component 10 and clamp body 30 which are made from a hard resin are not in direct contact, and because there is an elastic connecting component 50 made from soft resin between these, it is difficult to transmit the vibration. Because pipe holding component 10 and clamp body 30 are engaged in the horizontal and width-wise direction through elastic connecting component 50, it is difficult for them to slip. In accordance with an embodiment of this invention, by having a pipe holding component which holds the pipes, a clamp body which is attached to a body panel or the like, and an elastic component between them, it is possible to achieve an anti-vibration clamp having high joining strength between these structural elements.

It will be appreciated by persons skilled in the art that the above embodiments have been described by way of example only, and not in any limitative sense, and that various alterations and modifications are possible without departure from the scope of the invention as defined by the appended claims.

What is claimed is:

1. An anti-vibration clamp for securing a pipe on a mounting stud, the anti-vibration clamp comprising:
   a pipe holding component made of hard resin, the pipe holding component including a pipe holder for holding the pipe;
   a stud locking portion attachable to the stud;
   a clamp body being a separate body from the pipe holding component, and being made of hard resin, the clamp body including a floating attachment portion for holding the pipe holding component; and
   an elastic connecting component made of soft resin and located between the pipe holding component and the clamp body, and connecting the pipe holding component to the floating attachment portion of the clamp body; wherein
   the elastic connecting component being formed independently of the clamp body and the pipe holding component; and wherein
   the pipe holding component further includes a holding rib which projects at a first end of the pipe holding component;
   the elastic connecting component includes a holding rib containing portion located at a first end of the elastic connecting component and which contains the holding rib;
   the clamp body partially defines a holding rib insertion aperture at a first end of the floating attachment portion and the holding rib containing portion enters the holding rib insertion aperture; wherein
   the holding rib is contained in the holding rib insertion aperture through the holding rib containing portion, and the holding rib of the pipe holding component is held so that it does not contact the clamp body; and wherein
   the pipe holding component further includes a ridge located on a second end of the pipe holding component opposite to the first end;
   the elastic connecting component further includes a curved portion which is located at a second end of the elastic connecting component opposite to the first end of the elastic connecting component;
   the clamp body further includes a lock bar which projects diagonally downward and which is located at a second end of the clamp body opposite to the first end of the floating attachment portion; and
   the ridge of the pipe holding component is contained in the curved portion of the elastic connecting component, the curved portion of the elastic connecting component is pressed by the lock bar of the clamp body, and the ridge of the pipe holding component is held so that it does not contact the clamp body.

2. An anti-vibration clamp for securing a pipe on a mounting stud, the anti-vibration clamp comprising:
   a pipe holding component made of hard resin, the pipe holding component including a pipe holder for holding the pipe;
   a stud locking portion attachable to the stud;
   a clamp body being a separate body from the pipe holding component, and being made of hard resin, the clamp body including a floating attachment portion for holding the pipe holding component; and
   an elastic connecting component made of soft resin and located between the pipe holding component and the clamp body, and connecting the pipe holding component to the floating attachment portion of the clamp body; wherein
   the elastic connecting component being formed independently of the clamp body and the pipe holding component; and wherein
   the pipe holding component includes a pipe support of the pipe holding component, the elastic connecting component includes a pipe contacting portion, and the pipe support and pipe contacting portion are operable to support a pipe so that the pipe does not contact the clamp body.

3. An anti-vibration clamp for securing a pipe on a mounting stud, the anti-vibration clamp comprising:
   a pipe holding component made of hard resin, the pipe holding component including a pipe holder for holding the pipe;
   a stud locking portion attachable to the stud;
   a clamp body being a separate body from the pipe holding component, and being made of hard resin, the clamp body including a floating attachment portion for holding the pipe holding component; and
   an elastic connecting component made of soft resin and located between the pipe holding component and the clamp body, and connecting the pipe holding component to the floating attachment portion of the clamp body; wherein
   the elastic connecting component being formed independently of the clamp body and the pipe holding component; and wherein
   the clamp body includes a second pipe holder.

4. An anti-vibration clamp in accordance with claim 1, wherein:
   the pipe holder of the pipe holding component defines a pair of pipe holding component side walls, the elastic connecting component defines a pair of elastic connecting component side walls, and the floating attachment portion of the clamp body defines a pair of clamp body side walls;
   the pipe holding component side walls being disposed between the pair of clamp body side walls through the pair of elastic connecting component side walls; whereby
   the pair of side walls of the pipe holding component are prevented from contacting the clamp body side walls.

5. An anti-vibration clamp in accordance with claim 4, wherein:

the pipe holding component having an upper portion defining a pair of inclined portions which extend in the widthwise direction to the pipe holding component side walls, and a pair of planar plate portions below the inclined portions; and the elastic connecting component defining a pair of plate engaging portions having respective planar upper surfaces and being disposed below respective plate portions of the pipe holding component.

6. An anti-vibration clamp in accordance with claim 5, wherein:

the elastic connecting component defines a bottom wall;

the pipe holding component defines a base portion; and wherein the bottom wall covers part of the base portion.

* * * * *